US010220845B2

(12) United States Patent
Al-Stouhi

(10) Patent No.: US 10,220,845 B2
(45) Date of Patent: Mar. 5, 2019

(54) SYSTEM AND METHOD FOR PROVIDING VEHICLE COLLISION AVOIDANCE AT AN INTERSECTION

(71) Applicant: Honda Motor Co., Ltd., Tokyo (JP)

(72) Inventor: Samir K. Al-Stouhi, Dearborn, MI (US)

(73) Assignee: Honda Motor Co., Ltd., Tokyo (JP)

( * ) Notice: Subject to any disclaimer, the term of this patent is extended or adjusted under 35 U.S.C. 154(b) by 65 days.

(21) Appl. No.: 15/430,081

(22) Filed: Feb. 10, 2017

(65) Prior Publication Data

US 2017/0151944 A1 Jun. 1, 2017

Related U.S. Application Data

(63) Continuation of application No. 14/740,420, filed on Jun. 16, 2015, now Pat. No. 9,604,641.

(51) Int. Cl.
*B60W 30/09* (2012.01)
*B60W 10/08* (2006.01)
(Continued)

(52) U.S. Cl.
CPC ........ *B60W 30/0953* (2013.01); *B60W 10/04* (2013.01); *B60W 10/18* (2013.01);
(Continued)

(58) Field of Classification Search
CPC ............. B60W 30/0953; B60W 50/14; B60W 2550/12; B60W 2550/302; G08G 1/16; G08G 1/66
See application file for complete search history.

(56) References Cited

U.S. PATENT DOCUMENTS 6,049,295 A 4/2000 Sato
6,720,920 B2 4/2004 Breed et al.
(Continued)

FOREIGN PATENT DOCUMENTS

JP 201002529 5/2010

OTHER PUBLICATIONS

Maile, M., et al.: "Cooperative Intersection Collision Avoidance System for Violations (CICAS-V) for Avoidance of Violation-Based Intersection Crashes", Mercedes-Benz Research & Development North America, Inc., USA Paper No. 09-0118.

*Primary Examiner* — Yonel Beaulieu
*Assistant Examiner* — Martin A Weeks
(74) *Attorney, Agent, or Firm* — Rankin, Hill & Clark LLP

(57) ABSTRACT

A system and method for providing vehicle collision avoidance at an intersection include determining environmental parameters associated with a vicinity of the intersection. The system and method also include estimating a path of travel of a reference vehicle and a target vehicle, wherein the path of travel of the reference vehicle and the target vehicle are based on the environmental parameters and parameters pertaining to the reference vehicle and the target vehicle. Additionally, the system the method include estimating a probability of collision between the reference vehicle and the target vehicle at the intersection based on the path of travel of the reference vehicle and the target vehicle and providing a collision avoidance response, wherein a type of the collision avoidance response is based on the probability of collision between the reference vehicle and the target vehicle at the intersection.

20 Claims, 7 Drawing Sheets

(51) Int. Cl.
*B60W 10/20* (2006.01)
*B60W 10/04* (2006.01)
*G08G 1/16* (2006.01)
*B60W 50/14* (2012.01)
*B60W 30/095* (2012.01)
*B60W 10/18* (2012.01)
*B60W 30/18* (2012.01)

(52) U.S. Cl.
CPC ............ *B60W 10/20* (2013.01); *B60W 30/09* (2013.01); *B60W 30/18154* (2013.01); *B60W 50/14* (2013.01); *G08G 1/162* (2013.01); *G08G 1/166* (2013.01); *B60W 2050/143* (2013.01); *B60W 2550/12* (2013.01); *B60W 2550/14* (2013.01); *B60W 2550/302* (2013.01); *B60W 2550/308* (2013.01); *B60W 2550/402* (2013.01); *B60W 2550/404* (2013.01); *B60W 2550/408* (2013.01); *B60W 2710/18* (2013.01); *B60W 2710/20* (2013.01); *B60W 2720/10* (2013.01); *B60Y 2300/0954* (2013.01); *B60Y 2300/18158* (2013.01)

(56) References Cited

U.S. PATENT DOCUMENTS

| | | |
|---|---|---|
| 7,081,833 B2 | 7/2006 | Jo |
| 7,317,406 B2 | 1/2008 | Wolterman |
| 7,430,218 B2 | 9/2008 | Lee et al. |
| 7,873,474 B2 | 1/2011 | Yamamoto et al. |
| 8,027,762 B2 | 9/2011 | Otake et al. |
| 8,103,449 B2 | 1/2012 | Mudalige |
| 8,340,894 B2 | 12/2012 | Yester |
| 8,386,156 B2 | 2/2013 | Miller |
| 8,594,919 B2 | 11/2013 | Munakata |
| 8,639,437 B2 | 1/2014 | Caminiti et al. |
| 2005/0107954 A1 | 5/2005 | Nahla |
| 2009/0177347 A1* | 7/2009 | Breuer ............... B60T 7/22 701/31.4 |
| 2011/0298603 A1 | 12/2011 | King et al. |
| 2012/0029798 A1 | 2/2012 | Miller |
| 2012/0235947 A1 | 9/2012 | Yano et al. |
| 2014/0372016 A1* | 12/2014 | Buchholz ............... G08G 1/161 701/117 |
| 2015/0256624 A1 | 9/2015 | Buckel |
| 2015/0314780 A1* | 11/2015 | Stenneth ............... B60W 30/00 701/23 |

\* cited by examiner

SYSTEM AND METHOD FOR PROVIDING VEHICLE COLLISION AVOIDANCE AT AN INTERSECTION

CROSS-REFERENCE TO RELATED APPLICATION

This application is a continuation of, and claims priority to, U.S. application Ser. No. 14/740,420, filed on Jun. 16, 2015, the entire application of which is incorporated herein by reference.

BACKGROUND

Generally, intersections increase the collision risk for vehicles, particularly as relates to vehicle to vehicle collisions. This is due to the fact that drivers of vehicles may not be aware of the existence of other vehicles that are approaching the intersection from other directions. Additionally, drivers may have to account for other vehicles that may not abide by speed limits and/or traffic light/stop signs that are provided at the intersection. For example, certain vehicles may be approaching the intersection when another vehicle is bypassing a red light at a high rate of speed. Intersections also pose a higher risk for various types of collisions including head-on and side impact collisions caused by one vehicle crossing an opposing lane of traffic to turn at an intersection.

BRIEF DESCRIPTION

According to one aspect, a computer-implemented method for providing vehicle collision avoidance at an intersection includes determining environmental parameters associated with a vicinity of the intersection. The method also includes estimating a path of travel of a reference vehicle and a target vehicle, wherein the path of travel of the reference vehicle and the target vehicle are based on the environmental parameters and parameters pertaining to a positional location, a directional location, and vehicle dynamics of the reference vehicle and the target vehicle. Additionally, the method includes estimating a probability of collision between the reference vehicle and the target vehicle at the intersection based on the path of travel of the reference vehicle and the target vehicle. The probability of collision includes at least one value that is indicative of an intensity and a propensity of a collision between the reference vehicle and the target vehicle. The method also includes providing a collision avoidance response, wherein a type of the collision avoidance response is based on the probability of collision between the reference vehicle and the target vehicle at the intersection.

According to a further aspect, a system for providing vehicle collision avoidance at an intersection is provided that includes a memory storing instructions that when executed by a processor cause the processor to: determine environmental parameters associated with a vicinity of the intersection. The system also includes instructions that when executed cause the processor to estimate a path of travel of a reference vehicle and a target vehicle, wherein the path of travel of the reference vehicle and the target vehicle are based on the environmental parameters and parameters pertaining to a positional location, a directional location, and vehicle dynamics of the reference vehicle and the target vehicle. The system additionally includes instructions that when executed cause the processor to estimate a probability of collision between the reference vehicle and the target vehicle at the intersection based on the path of travel of the reference vehicle and the target vehicle. The probability of collision includes at least one value that is indicative of an intensity and a propensity of a collision between the reference vehicle and the target vehicle. The system further includes instructions that when executed cause the processor provide a collision avoidance response, wherein a type of the collision avoidance response is based on the probability of collision between the reference vehicle and the target vehicle at the intersection.

According to still another aspect, a computer readable storage medium storing instructions that, when executed by a processor, perform actions, including determining environmental parameters associated with a vicinity of an intersection. The instructions also include estimating a path of travel of a reference vehicle and a target vehicle, wherein the path of travel of the reference vehicle and the target vehicle are based on the environmental parameters and parameters pertaining to a positional location, a directional location, and vehicle dynamics of the reference vehicle and the target vehicle. The instructions additionally include estimating a probability of collision between the reference vehicle and the target vehicle at the intersection based on the path of travel of the reference vehicle and the target vehicle. The probability of collision includes at least one value that is indicative of an intensity and a propensity of a collision between the reference vehicle and the target vehicle. The instructions further include providing a collision avoidance response, wherein a type of the collision avoidance response is based on the probability of collision between the reference vehicle and the target vehicle at the intersection.

DETAILED DESCRIPTION

Figure 1:
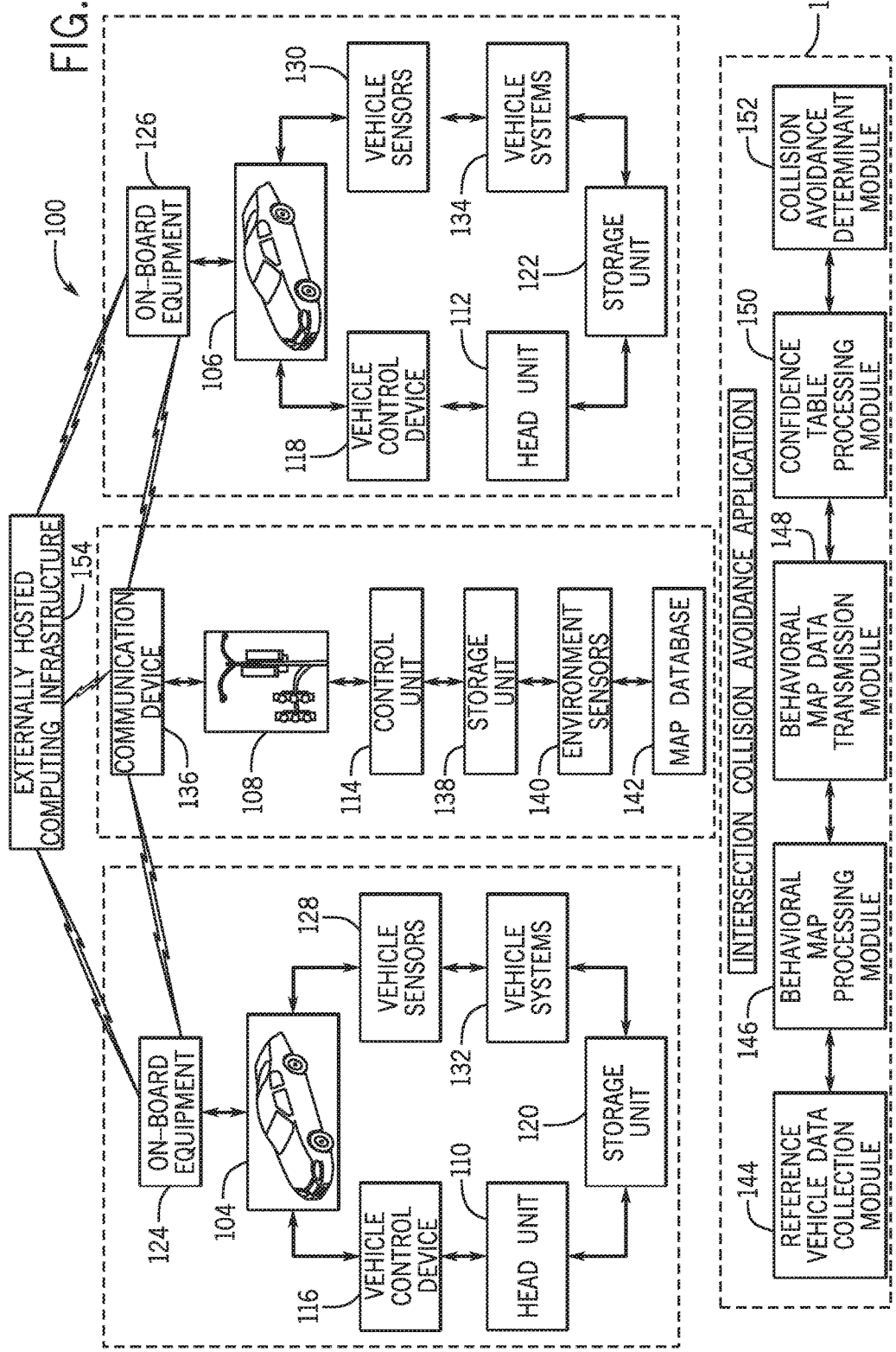
FIG. 1 is a schematic view of an operating environment for implementing systems and methods for vehicle collision avoidance at an intersection according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "wearable computing device", as used herein can include, but is not limited to, a computing device component (e.g., a processor) with circuitry that can be worn by and/or in possession of a user. In other words, a wearable computing device is a computer that is subsumed into the personal space of a user. Wearable computing devices can include a display and can include various sensors for sensing and determining various parameters associated with a user. For example, location, motion, and biosignal (physiological) parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones and personal wellness devices.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods for vehicle collision avoidance at an intersection according to an exemplary embodiment. The components of the environment 100, as well as the components of other systems, hardware architectures, and software architectures discussed herein, can be combined, omitted, or organized into different architectures for various embodiments.

Generally, the environment 100 includes an intersection collision avoidance (ICA) application 102 that is utilized to predict behaviors (e.g., path of travel, rate of travel, direction of travel, overlap between travel paths, etc.) of a plurality of vehicles at an intersection. It is to be appreciated that for purposes of simplicity one or more of the plurality of vehicles located near or at the intersection will be classified by the ICA application 102 as one or more reference vehicles 104 and another one or more of the plurality of vehicles located near or at the intersection will be classified as one or more target vehicles 106. As discussed in more detail below, data can be transmitted from one or more reference vehicles 104 to one or more roadside equipment (units) 108 (RSE) to provide a collision avoidance response at one or more of the target vehicles 106 that receive the data in a processed format from the RSE 108. As described in more detail below, the ICA application 102 can be executed on a head unit 110 of the reference vehicle(s) 104, a head unit 112 of the target vehicle(s) 106, a control unit(s) 114 of the RSE 108, and/or on an externally hosted computing infrastructure 154 that is accessed by the head units 110, 112 and/or the control unit(s) 114. Additionally, the ICA application 102 can utilize additional components of the reference vehicle(s) 104, the target vehicle(s) 106, and the RSE 108.

In the illustrated embodiment of FIG. 1, the reference vehicle(s) 104 and target vehicle(s) 106 can both include a respective vehicle computing device 116, 118 (VCD) with provisions for processing, communicating and interacting with various components of the vehicles 104, 106 and other components of the environment 100. In one embodiment, the VCDs 116, 118 can be implemented on the head units 110, 112 and respective electronic control units (not shown), among other components of the reference vehicle(s) 104 and target vehicle(s) 106. Generally, the VCDs 116, 118 includes a respective processor (not shown), a respective memory (not shown), a respective disk (not shown), and a respective input/output (I/O) interface (not shown), which are each operably connected for computer communication via a respective bus (not shown). The I/O interfaces provide software and hardware to facilitate data input and output between the components of the VCDs 116, 118 and other components, networks, and data sources, of the environment 100.

As will be described in more detail below, in one or more embodiments, the ICA application 102 can communicate one or more data commands to the VCD 118 to provide the collision avoidance response. Specifically, one or more components of the ICA application 102 can communicate one or more data commands to the VCD 118 to provide collision prevention warnings and/or autonomic vehicle collision controls. In an exemplary embodiment, the collision avoidance response can be provided by the ICA application 102 based on an estimated probability of collision between the target vehicle(s) 106 and the reference vehicle(s) 104 approaching and/or traveling through the intersection. As discussed below, the VCD 118 can provide the collision prevention warnings in the form of audio, visual, and/or tactile warnings to the driver(s) of the target vehicle(s) 106 to warn of the estimated probability of collision between the target vehicle(s) 106 and the reference vehicle(s) 104. Additionally, the VCD 118 can control one or more vehicle functions (e.g., steering, accelerating, braking, etc.) to provide the autonomic vehicle collision controls to control the target vehicle(s) 106 to avoid a collision with the reference vehicle(s) 104 based on the estimated probability of collision between the target vehicle(s) 106 and the reference vehicle(s) 104.

The VCDs 116, 118 are also operably connected for computer communication (e.g., via the bus and/or the I/O interface) to the head units 110, 112. The head units 110, 112 can be connected to one or more respective display devices (not shown) (e.g., display screens), respective audio devices (not shown) (e.g., audio system, speakers), respective haptic devices (not shown) (e.g., haptic steering wheel), etc. that are utilized to provide a human machine interface (HMI) (not shown) to provide a driver(s) of the target vehicle(s) 106 and/or the reference vehicle(s) 104 with various types of information.

In some embodiments, the head units 110, 112 can include respective storage units 120, 122. In alternate embodiments, the storage units 120, 122 can be included as stand alone components of the reference vehicle(s) 104 and/or the target vehicle(s) 106. The storage units 120, 122 can store one or more operating systems, applications, associated operating system data, application data, vehicle system and subsystem user interface data, and the like that are executed by the VCDs 116, 118 and/or the head units 110, 112. As will be discussed in more detail below, in an exemplary embodiment, the storage unit(s) 120 of the reference vehicle(s) 104 can be utilized by the ICA application 102 to store one or more vehicle parameters that are associated with the reference vehicle(s) 104. Additionally, the storage unit(s) 122 of the target vehicle(s) can be utilized by the ICA application 102 to store one or more vehicle parameters that are associated with the target vehicle(s) 106.

The reference vehicle(s) 104 and the target vehicle(s) 106 can additionally include respective on-board equipment (OBE) 124, 126. In one embodiment, the OBEs 124, 126 can include a respective processor (not shown), a respective memory (not shown), a respective disk (not shown), and a respective input/output (I/O) interface (not shown), which are each operably connected for computer communication via a respective bus (not shown). In an alternate embodiment, the OBE 124, 126 are operably controlled by the respective VCDs 116, 118 of the reference vehicle(s) 104 and the target vehicle(s) 106.

The OBE 124, 126 can include a respective communications device (not shown) that can communicate with one or more components of the operating environment 100 and/or additional systems and components outside of the operating environment 100. The respective communication device of each OBE 124, 126 can include, but is not limited to, one or more transceivers (not shown), one or more receivers (not shown), one or more transmitters (not shown), one or more antennas (not shown), and additional components (not shown) that can be utilized for wired and wireless computer connections and communications via various protocols. For example, the respective communication device can use a dedicated short range communication protocol (DSRC network) that can be used to provide data transfer to send/receive electronic signals with one or more RSE 108 to be utilized by the ICA application 102 over a respective RSE to OBE communication network. For example, the DSRC network can be configured to operate in a 5.9 GHz band that includes an approximate bandwidth of ~75 MHz and an approximate range of ~1610 m in order for the reference vehicle(s) 104 and the target vehicle(s) 106 to communicate with the RSE 108 over the RSE to OBE communication network. It is to be appreciated that in some embodiments, the OBE 124 of the reference vehicle(s) 104 and the OBE 126 of the target vehicle(s) 106 can directly communicate via the DSRC communication protocol via a vehicle to vehicle (V2V) network.

The reference vehicle(s) 104 and the target vehicle(s) 106 can additionally include respective vehicle sensors 128, 130 that can sense and provide the one or more vehicle parameters that are associated with the reference vehicle(s) 104 and the target vehicle(s) 106 to be used by the ICA application 102. It is understood that the vehicle sensors 128, 130 can include, but are not limited to, sensors associated with respective vehicle systems 132, 134 and other sensors associated with the reference vehicle(s) 104 and target vehicle(s) 106. Specific vehicle sensors 128, 130 can include, but are not limited to, vehicle speed sensors, vehicle acceleration sensors, vehicle angular velocity sensors, accelerator pedal sensors, brake sensors, steering wheel angle sensors, vehicle locational sensors (e.g., GNSS coordinates), vehicle directional sensors (e.g., vehicle compass), throttle position sensors, respective wheel sensors, anti-lock brake sensors, camshaft sensors, among other sensors. Other vehicle sensors 128, 130 can include, but are not limited to, cameras (not shown) mounted to the interior or exterior of the reference vehicle(s) 104 and target vehicle(s) 108, radar and laser sensors mounted to the exterior of the of the reference vehicle(s) 104 and target vehicle(s), etc. Additionally, vehicle sensors 128, 130 can include specific types of sensors that provide data pertaining to road conditions and the surrounding environment of the vehicle(s) 104, 106, such as, but not limited to, antilock brake sensors, daylight sensors, temperature sensors, wheel slip sensors, traction control sensors, etc. It is understood that the vehicle sensors 128, 130 can be any type of sensor, for example, acoustic, electric, environmental, optical, imaging, light, pressure, force, thermal, temperature, proximity, among others.

The reference vehicle(s) 104 and the target vehicle(s) 106 can additionally include respective vehicle systems 132, 134 that can sense and provide the one or vehicle parameters that are associated with the reference vehicle(s) 104 and the target vehicle(s) 106 to be used by the ICA application 102. It is understood that the vehicle systems 132, 134 can include, but are not limited to, systems associated with respective vehicle sensors 128, 130 and other subsystems associated with the reference vehicle(s) 104 and target vehicle(s) 106. Specific vehicle systems 132, 134 can include, but are not limited to, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

In an exemplary embodiment, the vehicle sensors 128, 130 and/or the vehicle systems 132, 134 are operable to output one or more data signals associated with reference vehicle(s) 104 and target vehicle(s) 106 to the storage units 120, 122, the head units 110, 112, the VCDs 116, 118, and/or the OBE 124, 126. As will be described in more detail below, these data signals can be converted by one or more components of the ICA application 102 into one or more vehicle parameters associated with the reference vehicle(s) 104 and target vehicle(s) 106. The one or more vehicle parameters associated with vehicles 104, 106 can be indicative of at least one of, positional parameters, directional parameters, and/or dynamic parameters. Positional parameters can include data that pertains to the position (e.g., GNSS coordinates at or near the intersection) of the reference vehicle(s) 104 and the target vehicle(s) 106. Directional parameters can include data that pertains to the directional orientation (e.g., heading at or near the intersection) of the reference vehicle(s) 104 and the target vehicle(s) 106. Dynamic parameters can include data that pertains to vehicle dynamics that include but are not limited to angular velocity and acceleration (hereinafter referred to as velocity) (e.g., real-time speed), braking, signal usage, steering angle, roll, pitch, yaw, etc. of the reference vehicle(s) 104 and the target vehicle(s) 106. Additionally, the dynamic parameters can include data that pertains to road conditions of the roadway (e.g., based on antilock break sensors, wheel slip sensors, etc.) on which the reference vehicle(s) 104 and the target vehicle(s) 106 are traveling.

In one or more exemplary embodiments, specific vehicle sensors 128, 130 including but not limited to GPS sensors can be utilized to provide the positional parameters that can include data that pertains to the position (e.g., GNSS coordinates) of the reference vehicle(s) 104 and/or the target vehicle(s) 106 that are approaching and/or traveling through the intersection. In additional embodiments, specific vehicle systems 132, 134 including, but not limited to the navigation system can be utilized to provide the positional parameters that can include data that pertains to the position of the reference vehicle(s) 104 and/or the target vehicle(s) 106.

In some embodiments, one or more magnetometers of the vehicle sensors 128, 130 can provide the directional parameters that can include data that pertains to the directional orientation (e.g., heading at or near the intersection) of the reference vehicle(s) 104 and/or the target vehicle(s) 106. In one or more embodiments, various vehicle sensors 128, 130 including speed sensors, acceleration sensors, brake sensors, signal sensors, wheel sensors, can output data signals pertaining to the dynamic performance of the reference vehicle(s) 104 and/or the target vehicle(s) 106. Additionally, in some embodiments, cameras mounted to the interior or exterior of the reference vehicle(s) 104 and/or target vehicle(s) 106, radar and laser sensors mounted to the exterior of the reference vehicle(s) 104 and/or target vehicle(s) 106 that are included as part of the vehicle systems 132, 134 can be utilized to provide one or more dynamic parameters.

As mentioned above, the operating environment 100 also includes one or more RSE 108 that can be included at the intersection. The one or more RSE 108 can include devices that are located at various locations within and surrounding the intersection. For example, the one or more RSE 108 can be included as devices that are attached to one or more street lights, traffic lights, road signs, and the like that are located at or near the intersection. Additionally, one or more RSE 108 can be included as devices that are included within the roadway. For example, one or more RSE 108 can be included as in-road devices that are positioned on one or more lane markers of the roadways that make up the intersection.

The control unit(s) 114 (e.g., a processor) of the one or more RSE 108 can process and compute functions associated with the components of the RSE 108. The RSE 108 can additionally include a communication device(s) 136 that can communicate with one or more components of the operating environment 100 and/or additional systems and components outside of the operating environment 100. The communication device(s) 136 of the RSE 108 can include, but is not limited to, one or more transceivers (not shown), one or more receivers (not shown), one or more transmitters (not shown), one or more antennas (not shown), and additional components (not shown) that can be used for wired and wireless computer connections and communications via various protocols, as discussed in detail above.

The communications device(s) 136 can be additionally used by one or more components of the RSE 108 to communicate with components that are residing externally from the RSE 108. For example, the control unit(s) 114 can utilize the communication device(s) 136 to access the head units 110, 112, and/or the external computing infrastructure to execute one or more externally hosted applications, including the ICA application 102.

The RSE 108 can additionally include a storage unit(s) 138. The storage unit(s) 138 can store one or more operating systems, applications, associated operating system data, application data, and the like that are executed by the control unit(s) 114. As will be discussed in more detail below, the storage unit(s) 138 can be accessed by the ICA application 102 to store the one or more vehicle behavioral maps that are processed by the ICAA 102 application.

The RSE 108 can additionally include environmental sensors 140. The environmental sensors 140 can include, but are not limited to, cameras, proximity sensors, motion sensors, temperature sensors, precipitation sensors, etc. The environmental sensors 140 can include control logic that is designed to determine environmental conditions that are present within the vicinity of the intersection and are output as one or more data signals (by sensing and/or downloading data) in the form of one or more environmental parameters. The one or more environmental parameters can reflect natural and man-made conditions that persist within a vicinity of the intersection (a predetermined area surrounding the intersection). In one embodiment, the environmental parameter(s) can be indicative of at least one of, infrastructure data, traffic data, and/or weather data. Infrastructure data can include, but is not limited to, data pertaining to the characteristics of infrastructure (e.g., width, length, number of lanes, number of intersection roadways, curbs, objects, speed limits, traffic lights/stop signs, etc.) of the intersection. Traffic data can include, but is not limited to, data pertaining to traffic patterns within the vicinity of the intersection. For example, traffic data can include metrics regarding traffic slowdown/stoppage based on various traffic issues including, but not limited to, vehicle accidents, road construction, and the like. Weather data can include, but is not limited to, data pertaining to natural weather conditions within the vicinity of the intersection. The weather data can include information regarding time of day, daylight, temperature, precipitation, etc. that can influence roadway conditions at the intersection. For example, the weather data can indicate snow and sleet that can cause icy roadway conditions at the intersection.

In one embodiment, the communications device(s) 136 can be utilized to connect to an externally hosted traffic control center (not shown) in order for the RSE 108 to upload and/or download environmental parameters that are indicative of traffic data and/or infrastructure data. In another embodiment, the communications device(s) 136 can also be utilized to connect to an externally hosted weather monitoring center (not shown) in order for the RSE 108 to upload/download environmental parameters that are indicative of weather data. In some embodiments, the RSE 108 can determine traffic and weather data at the intersection by utilizing data provided by the environmental sensors 140 in conjunction with data provided by the externally hosted traffic control center and/or the externally hosted weather monitoring center.

In one or more embodiments, the RSE 108 can also include a map database(s) 142 that is hosted on the storage unit(s) 138. In another embodiment, the RSE 108 can utilize the communication device(s) 136 to access the map database(s) 142 that is hosted on the externally hosted computing infrastructure 154. In an exemplary embodiment, the map database(s) 142 can include data that pertains to geographical maps and satellite/aerial imagery of the intersection in the form of road network data, landmark data, aerial view data, street view data, political boundary data, centralized traffic data, centralized infrastructure data, etc. As discussed below, the ICA application 102 can query the map database(s) 142 to obtain an intersection map and associated data.

II. The ICA Application and Related Methods

The components of the ICA application 102 will now be described according to an exemplary embodiment and with reference to FIG. 1. In an exemplary embodiment, the ICA application 102 can be stored on one or more of the storage units 120, 122, 138 and executed by one or more of the head unit(s) 110 of the reference vehicle(s) 104, the head unit(s) 112 of the target vehicle(s) 106, and/or the control unit(s) 114 of the RSE 108. In another embodiment, the ICA application 102 can be stored on the externally hosted computing infrastructure 154 and can be accessed by the OBE 124, 126 of the vehicles 104, 106 and/or the communication device(s) 136 of the RSE 108 to be executed by the head unit(s) 110 of the reference vehicle(s) 104, the head unit(s) 112 of the target vehicle(s) 106, and/or the control unit(s) 114 of the RSE 108.

The general functionality of the ICA application 102 will now be discussed. In an exemplary embodiment, the ICA application 102 can include a reference vehicle data collection module 144, a behavioral map processing module 146, a behavioral map data transmission module 148, a confidence table processing module 150, and a collision avoidance determinant module 152. In an exemplary embodiment, the ICA application 102 executes a training phase of the application 102 that is initiated to evaluate one or more vehicle parameters associated with the one or more reference vehicles 104 that are approaching and/or traveling through the intersection. During the training phase of the application 102, the RSE 108 can communicate with the OBE 124 of the reference vehicle(s) 104 to gather vehicle parameters to build one or more vehicle behavioral maps that indicate one or more vehicle parameters associated with the reference vehicle(s) 104. Additionally, the vehicle behavioral map(s) can include environmental parameters provided by the RSE 108 and/or the externally hosted traffic center/weather center. Upon building the one or more vehicle behavioral maps, the application 102 can execute a collision avoidance phase of the ICA application 102. During the collision avoidance phase, the RSE 108 can communicate with the OBE 126 of the target vehicle(s) 106 to transmit the one or more vehicle behavioral maps to the OBE 126 to provide a collision avoidance response at the target vehicle(s) 106. For example, the communication device(s) 136 can utilize the DSRC network to send/receive electronic signals with the reference vehicle(s) 104 and/or the target vehicle(s) 106 over the respective RSE to OBE communication network. As described in more detail below, the one or more behavioral maps can be processed by the ICA application 102 to build a confidence table of the predicted path of one or more reference vehicles 104 along with environmental conditions to estimate a probability of collision between the reference vehicle(s) 104 and the target vehicle(s) 106.

Figure 2:
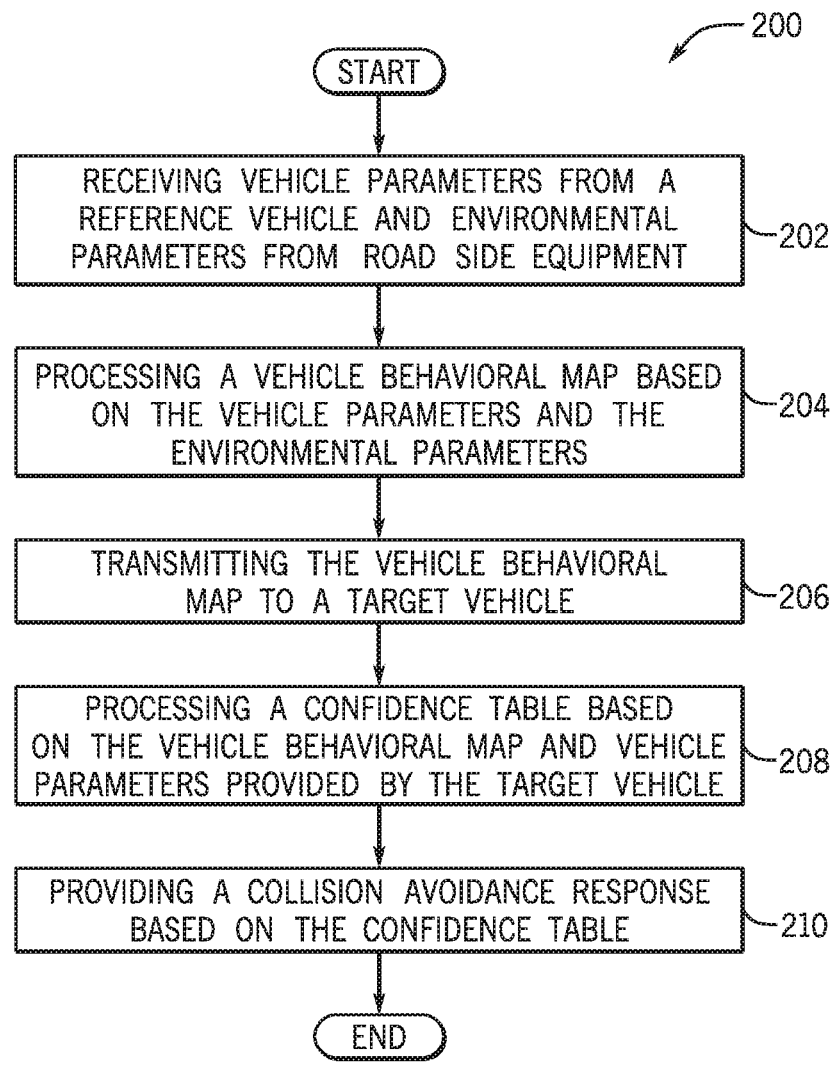
FIG. 2 is a process flow diagram of a method for providing vehicle collision avoidance executed by an intersection collision avoidance (ICA) application from the operating environment of FIG. 1 according to an exemplary embodiment.

FIG. 2 is a process flow diagram of a method 200 for providing vehicle collision avoidance executed by the ICA application 102 from the operating environment of FIG. 1 according to an exemplary embodiment. FIG. 2 will be described with reference to the components of FIG. 1, though it is to be appreciated that the method of FIG. 2 can be used with other systems/components. At block 202, the method includes receiving vehicle parameters from a reference vehicle(s) 104 and environmental parameters from roadside equipment.

In an exemplary embodiment, the reference vehicle data collection module 144 of ICA application 102 can utilize the environmental sensors 140 of one or more RSE 108 located at the intersection to determine the existence of one or more vehicles that are approaching or traveling through the intersection. Upon determining the existence of one or more vehicles that are approaching or traveling through the intersection, the vehicle data collection module 144 can classify the vehicle(s) as the reference vehicle(s) 104. Upon classifying the reference vehicle(s) 104, the data collection module 144 can utilize the communication device(s) 136 of the RSE 108 to establish computer communication with the OBE 124 of the reference vehicle(s) 104.

As discussed above, the vehicle sensors 128 of the reference vehicle(s) 128 are operable to output one or more data signals that include vehicle parameters associated with reference vehicle(s) 104. In an exemplary embodiment, upon establishing computer communication between the RSE 108 and the OBE 124, the reference vehicle data collection module 144 receives the vehicle parameters in the form of one or more data signals that are provided by the vehicle sensors 128. As discussed above, the vehicle parameters associated with reference vehicle 104 are indicative of at least one of: the positional parameters, the directional parameters, and/or the dynamic parameters.

Upon the vehicle sensors 128 outputting the one or more data signals that pertain to the vehicle parameters, the reference vehicle data collection module 144 utilizes the OBE 124 of the reference vehicle(s) 104 to communicate (e.g., transmit) respective data signals to the communication device(s) 136 of the RSE 108. In an exemplary embodiment, upon receiving the one or more data signals that pertain to the vehicle parameters, the reference vehicle data collection module 144, can store the vehicle parameters sent from the OBE 124 within the storage unit(s) 138 of the RSE 108.

Also as discussed above, the environmental sensors 140 of the RSE 108 are operable to output one or more data signals that include the environmental parameters associated with vicinity of the intersection. In some embodiments, the environmental parameters associated with the vicinity of the intersection can be downloaded from the externally hosted computing infrastructure 154. In an exemplary embodiment, upon receiving the one or more data signals that pertain to the environmental parameters, the reference vehicle data collection module 144, can store the one or more environmental parameters within the storage unit(s) 138 of the RSE 108.

At block 204, the method includes processing a vehicle behavioral map based on the vehicle parameters and the environmental parameters. Specifically, the behavioral map processing module 146 can utilize the control unit(s) 114 of the RSE 108 to access the vehicle parameters and the environmental parameters (stored on the storage unit(s) 138) provided by the reference vehicle data collection module 144 to process the vehicle behavioral map.

Figure 3:
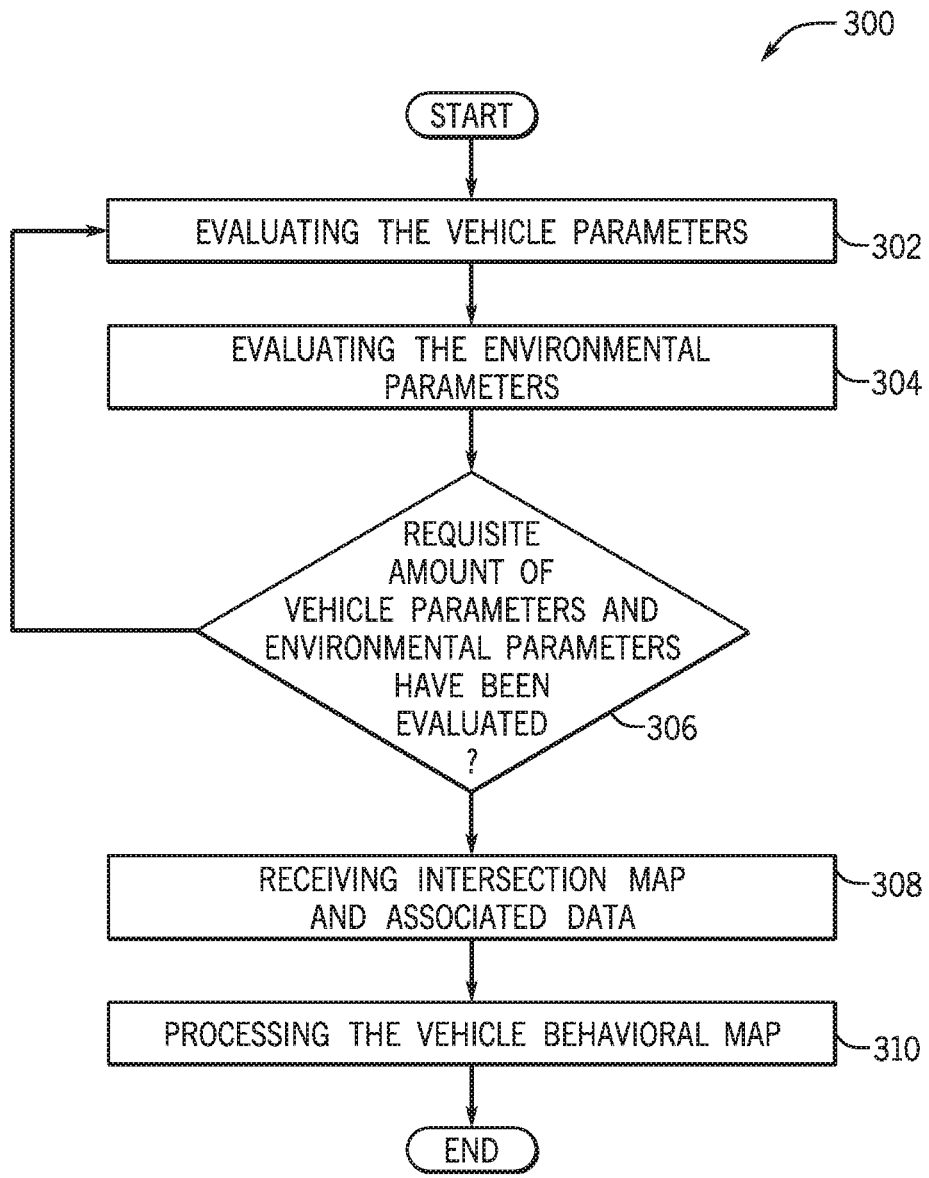
FIG. 3 is a process flow diagram of a method for processing an vehicle behavioral map from the operating environment of FIG. 1 according to an exemplary embodiment.

Referring now to FIG. 3, a process flow diagram of a method 300 for processing the vehicle behavioral map from the operating environment of FIG. 1 according to an exemplary embodiment. FIG. 3 will be described with reference to the components of FIG. 1, though it is to be appreciated that the method of FIG. 3 can be used with other systems/components.

At block 302, the method includes evaluating the vehicle parameters. In one embodiment, upon receiving the vehicle parameters provided by the reference vehicle data collection module 144, the behavioral map processing module 146 can evaluate the vehicle parameters to determine one or more attributes related to the manner in which the reference vehicle(s) 104 will approach and/or travel through the intersection. Specifically, the behavioral map processing module 146 can evaluate the positional parameters, directional parameters, and/or dynamic parameters associated with the reference vehicle(s) 104 to determine the one or more attributes related to the manner in which the reference vehicle(s) 104 will approach and/or travel through the intersection. As an illustrative example, the behavioral map processing module 146 can evaluate the vehicle parameters to determine the position of the reference vehicle(s) 104 with respect to the intersection, the heading of the reference vehicle(s) 104 with respect to the intersection, the speed of the reference vehicle(s) 104 when approaching and passing through the intersection, the (driver's) intent to turn (based on signaling, braking), and additional factors such as road conditions that can impact the one or more possible directions in which the reference vehicle(s) 104 will approach and/or travel through the intersection.

At block 304, the method includes evaluating the environmental parameters. In one embodiment, the behavioral map processing module 146 can communicate with the environmental sensors 140 of the RSE 108 to determine further environmental conditions that are present within the vicinity of the intersection. As discussed, the environmental parameters can include natural and man-made conditions that can impact the one or more attributes related the manner in which the reference vehicle(s) 104 will approach and/or travel through the intersection. In some embodiments, the behavioral map processing module 146 can aggregate the infrastructure data, traffic data, and the weather data provided by the environmental sensors 140 and the infrastructure data, traffic data, and weather data received from the externally hosted traffic control center and/or the externally hosted weather monitoring center to more clearly determine environmental factors such as traffic and/or road conditions that can impact the one or more possible directions in which the reference vehicle(s) 104 will approach and/or travel through the intersection.

At block 306, the method includes determining if a requisite amount of vehicle parameters and environmental parameters have been evaluated. In an exemplary embodiment, the vehicle parameters and environmental parameters can continue to be evaluated by the behavioral map processing module 146 until a requisite amount of data is received to process the vehicle behavioral map that is reliable (i.e., completely includes one or more attributes related to the manner in which the reference vehicle(s) 104 will approach and pass through the intersection). In one embodiment, based on the evaluation of the vehicle parameters and the environmental parameters, the behavioral map processing module 146 can determine intersection metrics that include, but are not limited to, traffic density, weather conditions, and/or the number of roadways that make up the intersection to determine if a requisite amount of vehicle parameter data and environmental parameter data have been evaluated. For example, if the intersection includes a large number of reference vehicles 104 and/or large number of possible routes that the reference vehicles 104 can travel after passing through the intersection, the behavioral map processing module 146 may require a larger subset of vehicle parameter data to process the vehicle behavioral map. Similarly, if high traffic density, inclement weather, and/or low daylight visibility persists within the vicinity of the intersection, the behavioral map processing module 146 may require a larger subset of environmental parameter data to process the vehicle behavioral map.

If it is determined that the requisite amount of vehicle parameter data and environmental parameter data have not been evaluated (at block 306), the method returns to block 302, wherein the behavioral map processing module 146 continues to evaluate the vehicle parameters. However, if it is determined that the requisite amount of vehicle parameter data and environmental parameter data have been evaluated (at block 306), at block 308 the method includes receiving an intersection map and associated data. In an exemplary embodiment, the behavioral map processing module 146 can access the map database(s) 142 of the RSE 108 to obtain the geographical map of the intersection. Specifically, the map database(s) 142 can be queried to obtain the geographical map of the intersection that can include, but is not limited to, road network data, landmark data, aerial view data, street view data, political boundary data, centralized traffic data, etc.

At block 310, the method includes processing the vehicle behavioral map. In an exemplary embodiment, upon obtaining the geographical map of the intersection from the map database(s) 142 of the RSE 108, the behavioral map processing module 146 can augment the geographical map with the location of one or more reference vehicles 104 that are approaching and/or traveling through the intersection. The behavioral map processing module 146 can additionally augment the geographical map with data that is indicative of expected vehicle maneuvers based on the evaluation of the vehicle parameters and the environmental parameters. In other words, the behavioral map processing module 146 can augment one or more possible route directions for each of the reference vehicles 104 approaching and/or traveling through the intersection based on the evaluated positional parameters, directional parameters, and/or dynamical parameters, captured by the vehicle sensors 128, along with evaluated infrastructure data, traffic data, and/or weather data captured by the environmental sensors 140, and/or provided by the externally hosted traffic control center and/or the externally hosted weather monitoring center.

Figure 4:
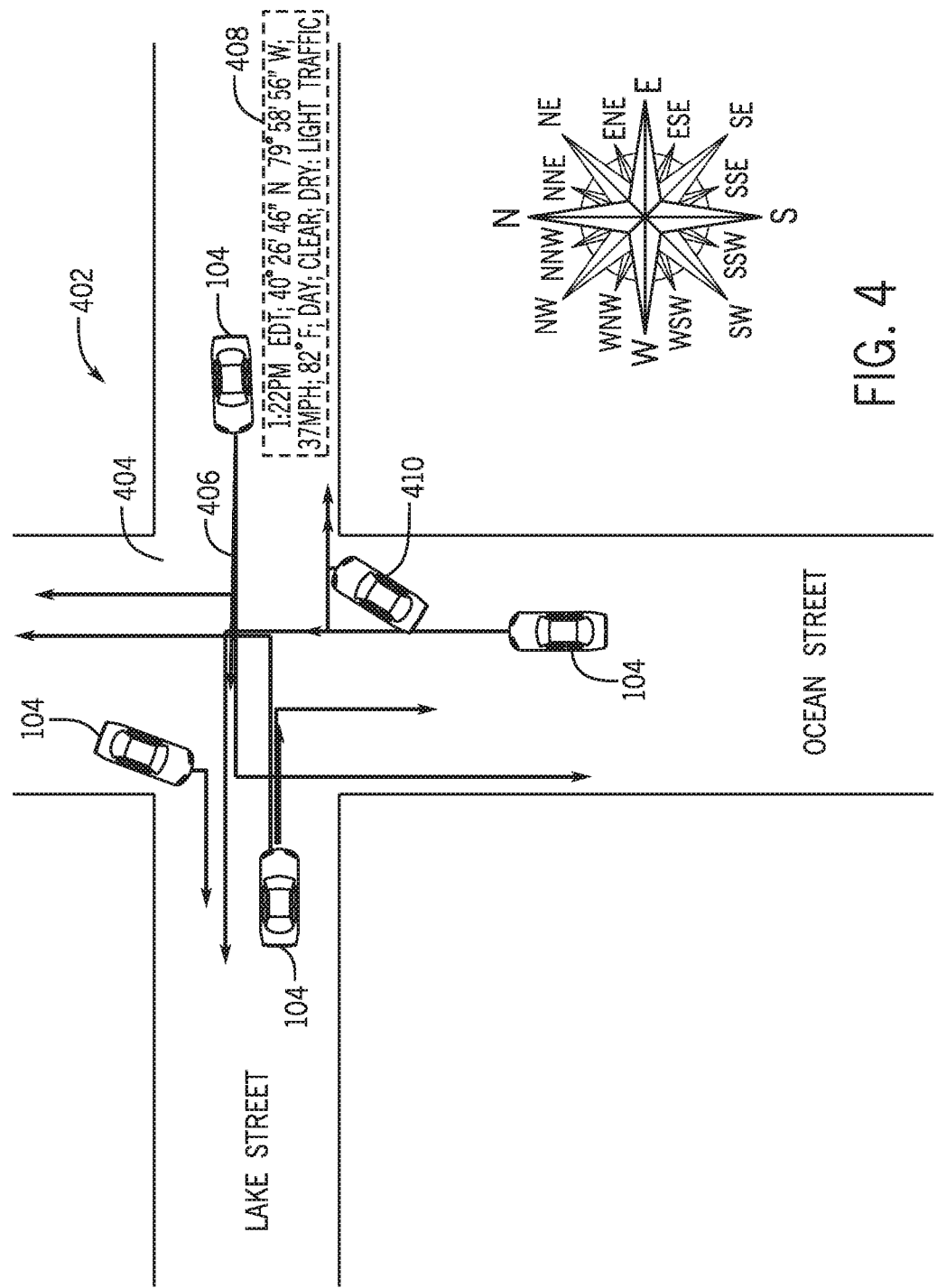
FIG. 4 is an illustration of the vehicle behavioral map processed by behavioral map processing module of the ICA application according to an exemplary embodiment.

In an exemplary embodiment, upon augmenting the geographical map, the behavioral map determinant module 136 can process the vehicle behavioral map by aggregating and packaging the augmented geographical map with additional vehicle parameter and environmental parameter data (e.g., vehicle speed, vehicle signal usage, vehicle break usage, directional orientation, weather conditions, traffic conditions, etc.). In some embodiments, the vehicle behavioral map can be processed as an overhead geographical map (as shown in FIG. 4). However, it is to be appreciated that the vehicle behavioral map can be processed into various types of formats, including, but not limited to, a multi-dimensional table, a data matrix, a three-dimensional/street view geographical map, etc.

FIG. 4 is an illustration of the vehicle behavioral map 402 processed by behavioral map processing module 146 of the ICA application 102. The vehicle behavioral map 402 shown in the illustration of FIG. 4 is presented as an over-head augmented geographical map that includes one or more attributes related to the manner in which the reference vehicle(s) 104 will approach and pass through the intersection 404.

In one or more embodiments, the vehicle behavioral map 402 can present one or more possible vehicle maneuvers 406 that the one or more reference vehicle(s) 104 can take as the reference vehicle(s) 104 approach and/or travel through the intersection 104. Specifically, as discussed above, based on the evaluation of the vehicle parameters and the environmental parameters, the behavioral map processing module 146 can determine one or more possible vehicle maneuvers that can be represented by directional arrows 406 on the vehicle behavioral map 402. The vehicle behavioral map 402 can also include a representation of the position of the one or more reference vehicles 104 that are located within the vicinity of the intersection 404. As shown, the one or more reference vehicles 104 can additionally be presented in accordance with a respective directional orientation such as the reference vehicle 410 that is presented as heading in a north east position.

In some embodiments, the vehicle behavioral map 402 can include additional vehicle parameter data and environmental parameter data in the form of one or more data stamps 408 that are augmented near one or more reference vehicles 104. In other embodiments, the data stamp(s) 408 can be provided as a data package that is not shown but is packaged into the vehicle behavioral map 402 to be evaluated by the confidence table processing module 150 of the ICA application 102 (as discussed below). The data stamp(s) 408 can include, but is not limited to, time of day, vehicle positional coordinates (e.g., GNSS coordinates), the directional orientation of the reference vehicle 104 (e.g., west), the speed of the reference vehicle 104, traffic and weather conditions within the vicinity of the intersection, etc.) In one or more embodiments, upon processing the vehicle behavioral map, the behavioral map processing module 146 can utilize the storage unit(s) 138 of the RSE(s) 108 to store the behavioral map to be used for various purposes, including, but not limited to, transmission to one or more target vehicles 106 (as discussed below), historical data collection, transmission to the externally hosted traffic control center, etc. In an alternate embodiment, upon processing the vehicle behavioral map, the behavioral map processing module 146 can utilize the communication device(s) 136 of the RSE(s) 108 to transmit the vehicle behavioral map in the form of one or more data signals to the externally hosted computing environment to be used for the various purposes discussed above.

With reference back to FIG. 1, in some embodiments, the ICA application 102 accounts for abnormal route activity that persists for a predetermined period of time that can negatively affect the training phase of the ICA application 102. More specifically, such abnormal route activity can include, but is not limited to, traffic accidents, road construction, power outages affecting traffic lights, etc. that can adversely affect the processing of the vehicle behavioral map by the behavioral map processing module 146. In other words, such abnormal route activity can adversely affect the ICA application 102 to provide a reliable collision avoidance response based on the evaluation of the vehicle behavioral map. In one embodiment, when the environmental parameters provided by the environmental sensors 140 and/or the environmental parameters communicated by externally hosted traffic control center (via the communication device(s) 136) are indicative of an abnormal route activity based on an abnormal flow of traffic through the intersection, the control unit(s) 114 can communicate the presence of the abnormal route activity to the behavioral map processing module 146 to temporarily stop the processing of the vehicle behavioral map. By stopping the processing of the vehicle behavioral map, the ICA application 102 can ensure that the abnormal route activity does not adversely affect the vehicle behavioral map with skewed and/or incorrect data that is based on the vehicle parameters and/or environmental parameters that are evaluated during the abnormal route activity.

In one or more embodiments, the behavioral map processing module 146 can restart the processing of the vehicle behavioral map upon the control unit(s) 114 communicating the presence of normal route activity that persists for a predetermined period of time to the behavioral map processing module 146. In an exemplary embodiment of the ICA application 102, upon processing the vehicle behavioral map, the ICA application 102 completes the training phase and commences the collision avoidance phase of the application 102 to provide the collision avoidance response at one or more target vehicles 106.

Referring again to FIG. 2, upon processing the vehicle behavioral map based on the vehicle parameters (at block 204), at block 206, the method includes transmitting the vehicle behavioral map to the target vehicle 106. In an exemplary embodiment, the behavioral map data transmission module 148 of the ICA application 102 can utilize the environmental sensors 140 of one or more RSE 108 located at the intersection to determine the existence of one or more vehicles that are approaching or traveling through the intersection. Upon determining the existence of one or more vehicles that are approaching or traveling through the intersection, the behavioral map data transmission module 148 can classify the vehicle(s) as the target vehicle(s) 106. Upon classifying the target vehicle(s) 106, the behavioral map data transmission module 148 can utilize the communication device(s) 136 of the RSE(s) 108 to establish computer communication with the OBE 126 of the target vehicle(s) 106. In an exemplary embodiment, upon establishing computer communication between the RSE(s) 108 and the OBE 126, the behavioral map data transmission module 148 transmits the vehicle behavioral map that was processed by the behavioral map processing module 146 at each RSE 108 in the form of one or more data signals to the OBE 126.

At block 208, the method includes processing a confidence table based on the vehicle behavioral map and vehicle parameters provided by the target vehicle 104. In an exemplary embodiment, the confidence table can be created for each target vehicle 106 approaching or traveling through the intersection. The confidence table can include a set of data elements that pertain to the vehicle parameters that are associated with one or more reference vehicles 104, each respective target vehicle 106, and environmental parameters that are associated with the intersection. It is to be appreciated that the confidence table can be processed into various types of formats, including, but not limited to, a multi-dimensional table, a data matrix, etc. As described in more detail below, the confidence table can be populated with data extracted from one or more vehicle behavioral maps and vehicle sensors 130 of the target vehicle(s) 106. As also will be described, the ICA application 102 can utilize the confidence table to provide a collision avoidance response at each target vehicle 106 approaching and/or traveling through the intersection. It is to be appreciated that the confidence table can also be utilized by various vehicle systems 134 including, but not limited to, vehicle safety systems to provide one or more safety features to the driver(s) of the target vehicle(s) 106.

Figure 5:
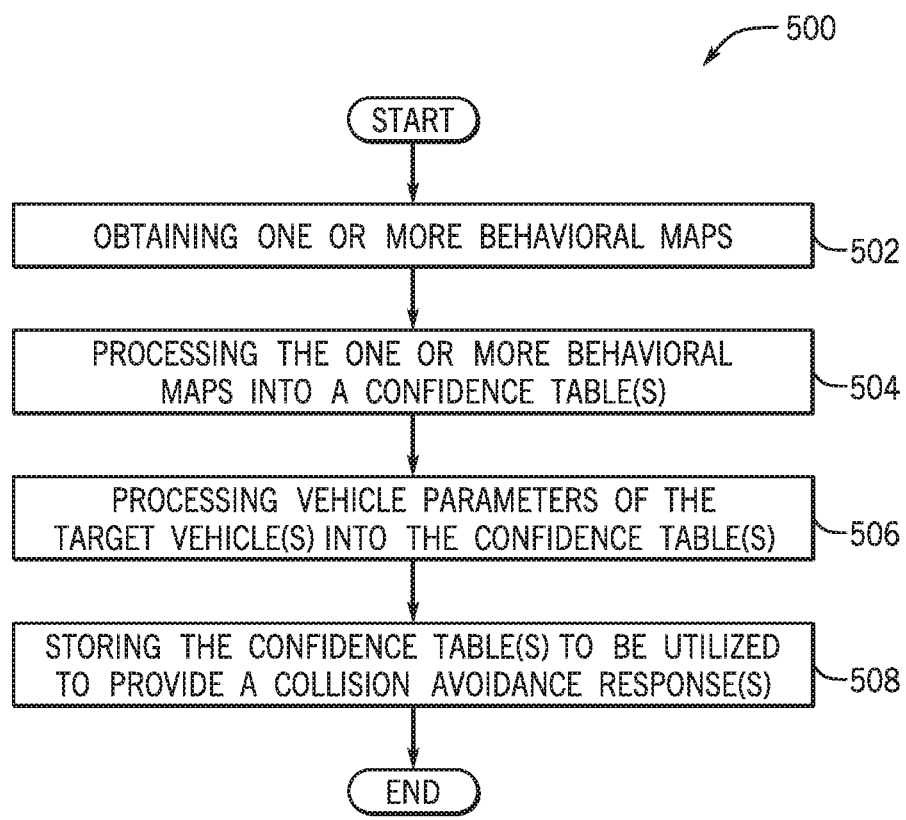
FIG. 5 is a process flow diagram of a method for processing a confidence table based on the vehicle behavioral map and vehicle parameters provided by a target vehicle(s) from the operating environment of FIG. 1 according to an embodiment.

FIG. 5 is a process flow diagram of a method 500 for processing a confidence table based on the vehicle behavioral map and vehicle parameters provided by the target vehicle(s) 106 from the operating environment of FIG. 1 according to an embodiment. FIG. 5 will be described with reference to the components of FIG. 1, though it is to be appreciated that the method of FIG. 5 can be used with other systems/components. At block 502, the method includes obtaining one or more behavioral maps. In an exemplary embodiment, upon the transmission of the vehicle behavioral map(s) from one or more RSE 108 located at the intersection to the OBE 126 of the target vehicle(s) 106, the confidence table processing module 150 can obtain the vehicle behavioral map(s) from the OBE 126. Upon obtaining the one or more vehicle behavioral maps from the OBE 126, the confidence table processing module 150 can store the one or more vehicle behavioral maps on the storage unit(s) 122 of the target vehicle(s) 106.

At block 504, the method includes processing the one or more behavioral maps into a confidence table(s). In one embodiment, when two or more RSE 108 transmit vehicle behavioral maps to the OBE 126 of the target vehicle(s) 106, upon obtaining the two or more vehicle behavioral maps, the confidence table processing module 150 can further evaluate the vehicle behavioral maps. Specifically, in one embodiment, the confidence table processing module 150 can evaluate the vehicle behavioral maps to extract data included within the vehicle behavioral maps. Upon extracting data from the vehicle behavioral maps, the confidence table processing module 150 can further evaluate the data to determine data consistencies and data inconsistencies between two or more vehicle behavioral maps. For example, the confidence table processing module 150 can determine data consistencies and/or data inconsistencies between the vehicle behavioral maps with respect to vehicle parameters that pertain to one or more reference vehicles 104 that are approaching or traveling through the intersection and/or environmental parameters that are associated with the vicinity of the intersection. Upon determining the data consistencies and data inconsistencies between the two or more vehicle behavioral maps, the confidence table processing module 150 can aggregate the consistencies between the two or more vehicle behavioral maps and can further populate the aggregated data into the confidence table(s).

In an alternate embodiment, if the intersection only includes a single RSE 108 that transmits a (single) vehicle behavioral map to the OBE 126 of the target vehicle(s) 106, upon receiving the behavioral map, the confidence table processing module 150 can further evaluate the vehicle behavioral map to extract data included within the vehicle behavioral map. Upon extracting the data, the behavioral map data transmission module 148 can convert the data into a format that can be populated into the confidence table.

At block 506, the method includes processing vehicle parameters of the target vehicle(s) 106 into the confidence table(s). In one embodiment, the confidence table processing module 150 can communicate with the vehicle sensors 130 of the target vehicle(s) 106 to receive vehicle parameters of the target vehicle(s) 106. Specifically, the confidence table processing module 150 can receive the positional parameters, directional parameters, and/or dynamic parameters associated with the target vehicle(s) 106. Upon receiving the vehicle parameters, the confidence table processing module 150 can convert the data into a format that can be populated into the confidence table. It is to be appreciated that the ICA application 102 can continually process the confidence table(s) with one or more behavioral maps and vehicle parameters of the target vehicle(s) 106 to provide up to date real time data to provide the collision avoidance response at the target vehicle(s) 106 approaching and/or traveling through the intersection.

At block 508, the method includes storing the confidence table(s) to be utilized to provide a collision avoidance response(s). In one embodiment, upon processing the confidence table(s) (at blocks 504 and 506), the confidence table processing module 150 can utilize the storage unit(s) 122 of the target vehicle(s) 106 to store the confidence table(s) to be further utilized by the ICA application 102 to provide the collision avoidance response at the target vehicle(s) 106 approaching and/or traveling through the intersection. In another embodiment, upon processing the confidence table(s), the confidence table processing module 150 can communicate with the externally hosted computing infrastructure 154 to store the confidence table(s) to be further accessed and utilized by the ICA application 102.

Referring again to FIG. 2, at block 210, the method includes providing a collision avoidance response based on the confidence table. In an exemplary embodiment, the collision avoidance determinant module 152 of the ICA application 102 can access the confidence table(s) stored on the storage unit(s) 122 of the target vehicle(s) or the externally hosted computing infrastructure 154 to evaluate data contained within the confidence table(s). As will be described in more detail below, the data can be analyzed to estimate a probability of collision between the one or more reference vehicles 104 and the one or more target vehicles 106 approaching and/or traveling through the intersection. The collision avoidance determinant module 152 can utilize the estimation of the probability of collision to provide the collision avoidance response at the one or more target vehicles 106 approaching and/or traveling through the intersection to avoid a possible collision with one or more reference vehicles 104 that are also approaching and/or traveling through the intersection.

Figure 6:
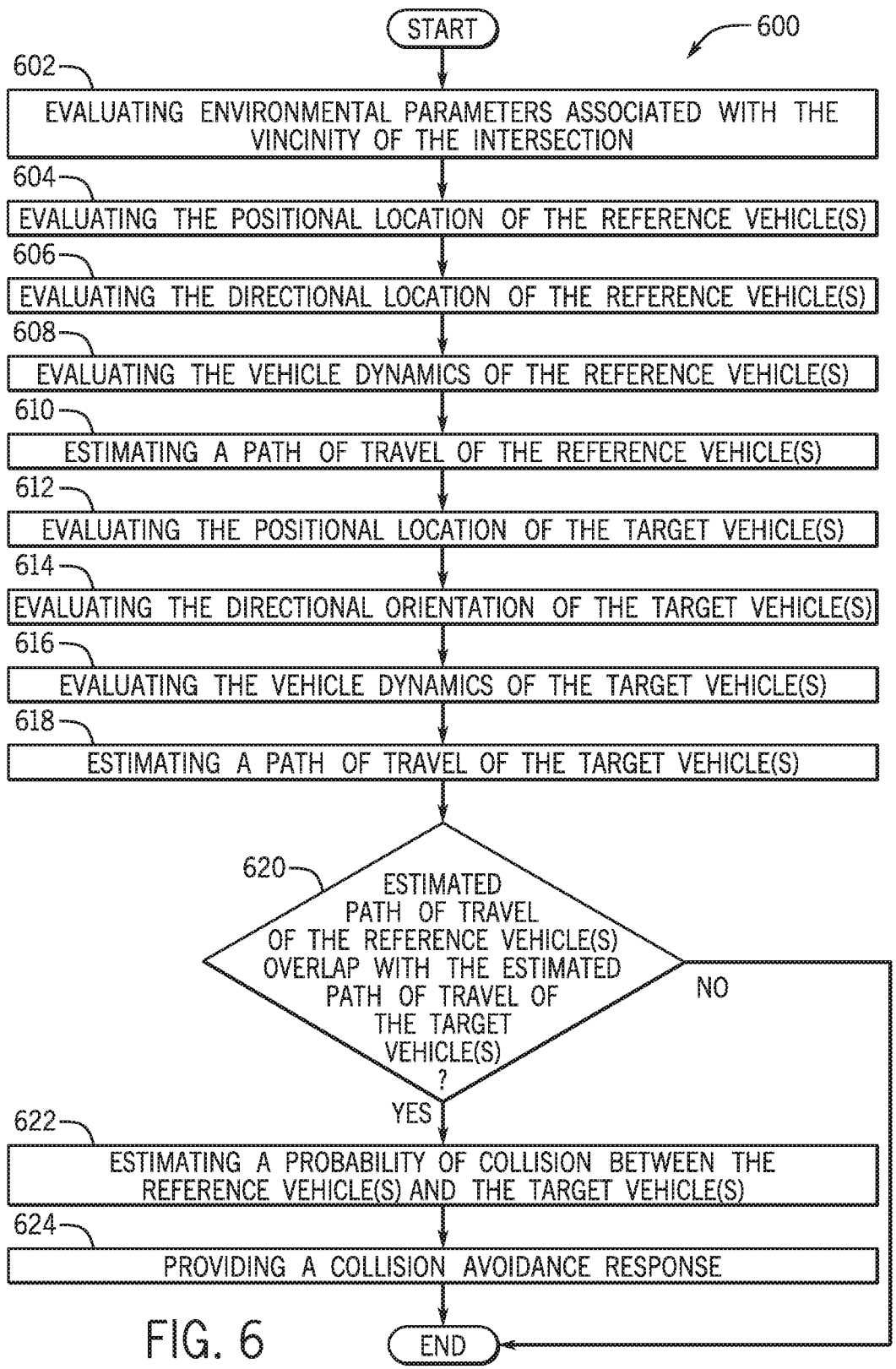
FIG. 6 is a process flow diagram of a method for estimating a path of travel of reference vehicle(s) and target vehicle(s) for providing a collision avoidance response from the operating environment of FIG. 1 according to an exemplary embodiment.

FIG. 6 is a process flow diagram of the method 600 for estimating a path of travel of the reference vehicle(s) 104 and the target vehicle(s) 106 to provide a collision avoidance response from the operating environment of FIG. 1 according to an embodiment. FIG. 6 will be described with reference to the components of FIG. 1, though it is to be appreciated that the method of FIG. 6 can be used with other systems/components. At block 602, the method includes evaluating environmental parameters associated with the vicinity of the intersection. Specifically, the collision avoidance determinant module 152 can access the confidence table(s) stored on the storage unit 122 or the externally hosted computing infrastructure 154. Upon accessing the confidence table(s), the collision avoidance determinant module 152 can evaluate the confidence table(s) to determine environmental parameters that include the infrastructure data, traffic data, and/or weather data that pertains to the infrastructure of the intersection, the real time traffic pattern within the vicinity of the intersection, and the real time weather within the vicinity of the intersection. Specifically, the collision avoidance determinant module 152 can determine infrastructure characteristics (e.g., width, length, number of lanes, number of intersection roadways, curbs, objects, speed limits, traffic lights/stop signs, etc.) of the intersection. The collision avoidance determinant module 152 can also determine the real time traffic pattern that can influence the flow of traffic that travels through the intersection. Additionally, the collision avoidance determinant module 152 can also determine the real time weather that can influence the road visibility and the flow of traffic that travels through the intersection. As will be discussed in detail, the collision avoidance determinant module 152 can utilize the environmental parameters when estimating the future position of the reference vehicle(s) 104 and the target vehicle(s) 106 approaching or traveling through the intersection. Additionally, the environmental parameters can be further evaluated when determining if an overlap exists between the reference vehicle(s) 104 and the target vehicle(s) 106 approaching or traveling through the intersection.

At block 604, the method includes evaluating the positional location of the reference vehicle(s) 104. Specifically, the collision avoidance determinant module 152 can access the confidence table(s) to evaluate the positional parameters of the reference vehicle(s) 104 to determine a real time positional location of the reference vehicle(s) 104 which is indicative of the exact location of the reference vehicle(s) 104 with respect to the intersection (e.g., GNSS coordinates).

At block 606, the method includes evaluating the directional location of the reference vehicle(s) 104. Specifically, the collision avoidance determinant module 152 can access the confidence table(s) to evaluate the directional parameters of the reference vehicle(s) 104 to determine a real time directional orientation of the reference vehicle(s) 104 which is indicative of the heading of the reference vehicle(s) 104 as the reference vehicle(s) 104 is approaching and/or traveling through the intersection.

At block 608, the method includes evaluating the vehicle dynamics the reference vehicle(s) 104. Specifically, the collision avoidance determinant module 152 can access the confidence table(s) to evaluate the dynamic parameters of the reference vehicle(s) 104 to determine real time data pertaining to speed, braking, signal usage, steering angle, roll, pitch, yaw, etc. of the reference vehicle(s) 104 which can be utilized to estimate a rate of travel of the reference vehicle(s) 104 as the reference vehicle(s) 104 is approaching and/or is traveling through the intersection.

At block 610, the method includes estimating a path of travel of the reference vehicle(s) 104. In an exemplary embodiment, the collision avoidance determinant module 152 can aggregate the evaluated environmental parameters, positional location of the reference vehicle(s) 104, directional location of the reference vehicle(s) 104 and the vehicle dynamics of the reference vehicle(s) 104 to estimate the path of travel of the reference vehicle(s) 104 as the reference vehicle(s) 104 is approaching and/or is traveling through the intersection.

Figure 7:
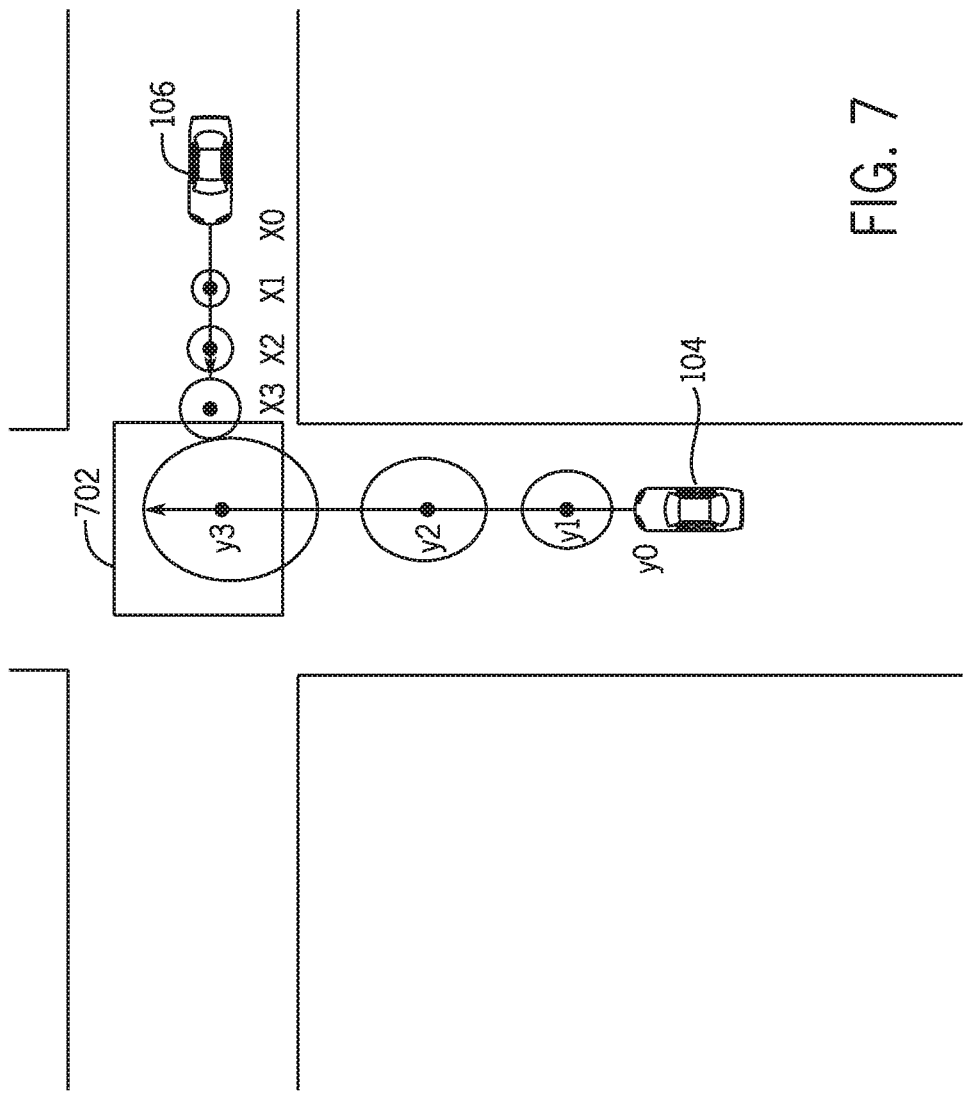
FIG. 7 is an illustrative example of estimating an overlap between the expected path of the reference vehicle(s) and the expected path of the target vehicle(s) approaching or traveling through the intersection according to an exemplary embodiment.

FIG. 7 is an illustrative example of estimating an overlap between the expected path of the reference vehicle(s) 104 and the expected path of the target vehicle(s) 106 approaching and/or traveling through the intersection according to an exemplary embodiment. In an exemplary embodiment, the collision avoidance determinant module 152 can evaluate the positional location of the reference vehicle 104 (shown as y0) and the directional orientation of the reference vehicle 104 (as represented by the arrow from y0) to determine the direction in which the reference vehicle 104 will travel (left turn, right turn, straight, etc.) once the reference vehicle 104 passes through the intersection 702. In some embodiments, the collision avoidance determinant module 152 can also evaluate the environmental data (based on the evaluation at block 602) to determine that the intersection 702 is located a certain distance ahead of the reference vehicle 104. Additionally, the collision avoidance determinant module 152 can evaluate the vehicle dynamics of the reference vehicle 104 to estimate the rate of travel of the reference vehicle 104 (based on the speed, acceleration, braking, signaling, etc.). The rate of travel of the reference vehicle 104 can be utilized to predict a timeframe in which the reference vehicle 104 will arrive at the intersection 702. As discussed above, the collision avoidance determinant module 152 can aggregate the evaluated data (at blocks 602, 604, 606, and/or 608 of the method 600) to estimate the path of travel of the reference vehicle 104 (shown as estimated positions y1, y2, y3).

Referring again to FIG. 6, at block 612, the method includes evaluating the positional location of the target vehicle(s) 106. Specifically, the collision avoidance determinant module 152 can utilize the vehicle sensors 130 to provide one or more real time vehicle parameters associated with the target vehicle(s) 106. In one embodiment, the collision avoidance determinant module 152 can communicate with the GPS sensors to determine the positional parameters pertaining to the exact location of the target vehicle(s) 106 with respect to the intersection (e.g., GNSS coordinates).

At block 614, the method includes evaluating the directional location of the target vehicle(s) 106. In one embodiment, the collision avoidance determinant module 152 can communicate with one or more magnetometers of the vehicle sensors 130 that can be utilized to provide directional parameters pertaining to the heading of the target vehicle(s) 106 approaching or traveling through the intersection.

At block 616, the method includes evaluating the vehicle dynamics of the target vehicle 106. In one embodiment, the collision avoidance determinant module 152 can communicate with one or more sensors, including, but not limited to vehicle speed sensors, vehicle acceleration sensors, vehicle angular velocity sensors, accelerator pedal sensors, brake sensors, steering wheel angle sensors, signal sensors, throttle position sensors, etc. to determine real time data pertaining to speed, braking, signal usage, steering angle, roll, pitch, yaw, etc. of the target vehicle(s) 106 that can be utilized to estimate a rate of travel of the target vehicle(s) 106 as the target vehicle(s) 106 is approaching and/or is traveling through the intersection.

At block 618, the method includes estimating a path of travel of the target vehicle(s) 106. In an exemplary embodiment, the collision avoidance determinant module 152 can aggregate the evaluated environmental parameters, positional location of the target vehicle(s) 106, directional location of the target vehicle(s) 106 and the vehicle dynamics of the target vehicle(s) 106 to estimate the path of travel of the target vehicle(s) 106 as the target vehicle(s) 106 is approaching and/or is traveling through the intersection.

Referring again to the illustrative example of FIG. 7, the collision avoidance determinant module 152 can evaluate the positional location of the target vehicle 106 (shown as X0) and the directional orientation of the target vehicle 106 (as represented by the arrow from x0) to determine the direction in which the reference vehicle 104 will travel (left turn, right turn, straight, etc.) once the target vehicle 106 passes through the intersection 702. In some embodiments, the collision avoidance determinant module 152 can also evaluate the environmental data (based on the evaluation at block 602) to determine that the intersection 702 is located a certain distance ahead of the target vehicle 106. Additionally, the collision avoidance determinant module 152 can evaluate the vehicle dynamics of the target vehicle 106 to estimate the rate of travel of the target vehicle 106 (based on the speed, acceleration, braking, signaling, etc.). The rate of travel of the target vehicle 106 can be utilized to predict a timeframe in which the target vehicle 106 will arrive at the intersection 702. The collision avoidance determinant module 152 can aggregate the evaluated data (at blocks 602, 612, 614, and/or 616 of the method 600) to estimate the path of travel of the target vehicle(s) 106 (shown as estimated positions x1, x2, x3).

Referring again to FIG. 6, at block 620, the method includes determining if the estimated path of travel of the reference vehicle(s) 104 overlap with the estimated path of travel of the target vehicle(s) 106. In an exemplary embodiment, the collision avoidance determinant module 152 can evaluate the estimated path of the reference vehicle(s) 104 (determined at block 610) and the estimated path of the target vehicle(s) 106 (determined at block 618) to determine one or more estimated points of overlap. As illustrated in FIG. 7, the estimated path of the reference vehicle 104 will be compared to the estimated path of the target vehicle 106 to estimate an overlap of the estimated future position of the target vehicle 106 at x3 and the estimate future position of the reference vehicle 104 at y3.

In an alternate embodiment, the collision avoidance determinant module 152 can access one or more vehicle behavioral maps from the storage unit 122 and/or the externally hosted computing infrastructure 154 to determine one or more points of overlap of the directional arrows (as shown in FIG. 4 as 406) that represent the one or more possible vehicle maneuvers on the vehicle behavioral map(s).

At block 622, the method includes estimating a probability of collision between the reference vehicle(s) 104 and the target vehicle(s) 106. In an exemplary embodiment, the collision avoidance determinant module 152 can further evaluate the vehicle parameters of the reference vehicle(s) 104 and/or target vehicle(s) 106, the environmental parameters associated with the vicinity of the intersection, additional data provided by the vehicle sensors 128, 130, and/or additional data provided by the vehicle systems 132, 134 to estimate a probability of collision. In one or more embodiments, the probability of collision can include one or more values that can be indicative of an intensity and propensity of collision between the reference vehicle(s) 104 and the target vehicle(s) 106. Some non-limiting exemplary embodiments of utilizing vehicle parameters, environmental parameters, and/or additional vehicle sensor/system data will now be discussed that can be utilized to determine the probability of collision between the reference vehicle(s) 104 and the target vehicle(s) 106.

In one embodiment, collision avoidance determinant module 152 can utilize the vehicle parameters and environmental parameters to estimate a higher probability of collision when the reference vehicle(s) 104 and/or the target vehicle(s) 106 are traveling at a high rate of speed during heavy traffic conditions since drivers of the reference vehicle(s) 104 and/or target vehicle(s) 106 may have less reaction time to avoid the collision. Alternatively, the collision avoidance determinant module 152 can estimate a lower probability when the reference vehicle(s) 104 and/or the target vehicle(s) 106 are traveling at a low rate of speed during lighter traffic conditions.

In another embodiment, the collision avoidance determinant module 152 can communicate with the vehicle system(s) 134 of the target vehicle(s) 106 to evaluate vehicle safety system data to determine if the driver(s) has been warned of the potential collision with the reference vehicle(s) 104. Vehicle systems 134, including, but not limited to, a blind spot sensing system, a collision avoidance system, a lane keep assist system, and the like can be used to warn the driver(s) of the target vehicle(s) 106 of one or more potential safety hazards. The collision avoidance determinant module 152 can evaluate the safety system data to determine if the reference vehicle(s) 104 is detected by the safety system data (i.e., the driver(s) of the target vehicle(s) 106 is provided a warning or notification of the presence or location of the reference vehicle(s) 104 at the intersection). Based on this evaluation, the collision avoidance determinant module 152 can increase or decrease the probability of collision since the driver(s) that have been warned of the presence of the reference vehicle(s) 104 may adjust for such a condition to avoid a collision.

In an additional embodiment, the collision avoidance determinant module 152 can communicate with the vehicle system(s) 134 of the target vehicle(s) 106 to evaluate navigation system data to determine if the driver(s) has inputted a destination and is following predetermined navigation directions. Specifically, the collision avoidance determinant module 152 can evaluate the navigation data to determine if driver of target vehicle(s) 106 is following a path (based on the predetermined navigation directions) that will directly intersect with the path of the reference vehicle(s) 104 approaching or traveling through the intersection. Based on this evaluation, the collision avoidance determinant module 152 can further evaluate additional vehicle parameters and/or environmental parameters to increase or decrease the probability of collision since the predetermined path of target vehicle(s) 106 can intersect with the path of reference vehicle(s) 104. Therefore, the vehicle safety system data can be utilized by the collision avoidance determinant module 152 to estimate the probability of collision between the reference vehicle(s) 104 and the target vehicle(s) 106. It is appreciated that various additional data supplied by the vehicle sensors 128, 130, the VCDs 116, 118, and/or additional vehicle systems 132, 134 not discussed herein will be apparent to determine the probability of collision between the reference vehicle(s) 104 and the target vehicle(s) 106. It is also to be appreciated that as the reference vehicle(s) 104 and the target vehicle(s) 106 are approaching and/or traveling through the intersection, the probability of collision between the reference vehicle(s) 104 and the target vehicle(s) 106 can be continuously updated.

At block 624, the method includes providing a collision avoidance response. In an exemplary embodiment, the collision avoidance determinant module 152 can communicate with the VCD 118 to provide the collision avoidance response. The collision avoidance determinant module 152 can communicate with the VCD 118 to provide one or more collision prevention warnings to the driver(s) of the target vehicle(s) 106 via the vehicle systems 134 via audio, visual, or tactile feedback. Additionally, the collision avoidance determinant module 152 can also communicate with the VCD 118 to provide one or more autonomic vehicle collision controls in order decelerate the speed of the target vehicle(s) 106, stop the target vehicle(s) 106 and/or alter the course of the target vehicle(s) 106.

In one embodiment, the collision avoidance determinant module 152 can determine a collision probability range that is representative of the probability of collision between the reference vehicle(s) 104 and the target vehicle(s) 106. For instance, the collision probability range can be divided into ten subunits, wherein a lower probability of collision can be represented as a value of 1 and an extremely high probability of collision can be represented as a value of 10. However, it is to be appreciated that the collision avoidance determinant module 152 can provide the estimation of the probability of collision in various types of formats such as different ranges, metrics, and values. In one or more embodiments, the collision avoidance determinant module 152 can provide the one or more collision prevention warnings and/or autonomic vehicle collision controls at a level that corresponds to the collision probability range value. For example, a low intensity warning (indicative of a low collision probability range value such as 1-3 values) can include a simple audio buzzing warning that is presented to the driver of the target vehicle(s) 106. A medium intensity warning (indicative of a medium collision probability range value such as 4-6 values) can include tactile feedback via a steering wheel of the vehicle followed by a gradual slowing down of the target vehicle(s) 106. A high intensity warning (indicative of a high collision probability range value such as 7-10 values) can include tactile, audio, and visual feedback corresponding to autonomously changing the course of the target vehicle(s) 106 and/or stopping the target vehicle(s) 106. It is appreciated that other embodiments are apparent to provide a collision avoidance response to one or more target vehicles 106.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also indented to be encompassed by the following claims.

The invention claimed is:

1. A computer-implemented method for providing vehicle collision avoidance at an intersection, comprising:
   determining environmental parameters associated with a vicinity of the intersection,
   estimating a path of travel of a reference vehicle and a target vehicle, wherein the path of travel of the reference vehicle and the target vehicle are based on the environmental parameters and parameters pertaining to a positional location, a directional location, and vehicle dynamics of the reference vehicle and the target vehicle;
   estimating a probability of collision between the reference vehicle and the target vehicle at the intersection based on the path of travel of the reference vehicle and the target vehicle, wherein the probability of collision includes at least one value that is indicative of an intensity of collision and a propensity of collision between the reference vehicle and the target vehicle; and providing a collision avoidance response, wherein the collision avoidance response is based on the probability of collision between the reference vehicle and the target vehicle at the intersection.

2. The computer-implemented method of claim 1, wherein determining the environmental parameters includes receiving data collected from roadside equipment located within the vicinity of the intersection and evaluating intersection metrics processed from the data to determine that a requisite amount of the data is collected from the roadside equipment to determine the environmental parameters, wherein the intersection metrics include at least one of: a traffic density within the vicinity of the intersection, weather conditions within the vicinity of the intersection, and a number of roadways that intersect at the intersection.

3. The computer-implemented method of claim 1, wherein determining the environmental parameters includes ceasing the determination of environmental parameters associated with the vicinity of the intersection for a period of time to account for an abnormal route activity that occurs within the vicinity of the intersection, wherein the abnormal route activity includes at least one of: a traffic accident that occurs within the vicinity of the intersection, road construction that occurs within the vicinity of the intersection, and a power outage that occurs within the vicinity of the intersection.

4. The computer-implemented method of claim 3, wherein determining the environmental parameters includes restarting the determination of environmental parameters associated with the vicinity of the intersection upon completion of the abnormal route activity that occurred within the vicinity of the intersection.

5. The computer-implemented method of claim 1, wherein estimating the path of travel of the reference vehicle and the target vehicle includes evaluating positional parameters pertaining to the positional location of the reference vehicle and the target vehicle, directional parameters pertaining to the directional location of the reference vehicle and the target vehicle, and dynamic parameters pertaining to the vehicle dynamics of the reference vehicle and the target vehicle.

6. The computer-implemented method of claim 5, wherein estimating the path of travel of the reference vehicle and the target vehicle includes aggregating the environmental parameters associated with the vicinity of the intersection with the positional parameters, the directional parameters, and the dynamic parameters of the reference vehicle and of the target vehicle.

7. The computer-implemented method of claim 1, wherein estimating the probability of collision between the reference vehicle and the target vehicle at the intersection includes determining if the path of travel of the reference vehicle overlaps with the path of travel of the target vehicle.

8. The computer-implemented method of claim 1, wherein estimating the probability of collision between the reference vehicle and the target vehicle at the intersection includes adjusting the at least one value that is indicative of the intensity of the collision and the propensity of the collision between the reference vehicle and the target vehicle based on a potential collision warning provided within at least one of: the reference vehicle and the target vehicle.

9. The computer-implemented method of claim 1, wherein estimating the probability of collision between the reference vehicle and the target vehicle at the intersection includes adjusting the at least one value that is indicative of the intensity of the collision and the propensity of the collision between the reference vehicle and the target vehicle based on an intended destination of the target vehicle, wherein the intended destination includes a destination received by a navigation system of the target vehicle.

10. A system for providing vehicle collision avoidance at an intersection, comprising:
a memory storing instructions that when executed by a processor cause the processor to:
determine environmental parameters associated with a vicinity of the intersection;
estimate a path of travel of a reference vehicle and a target vehicle, wherein the path of travel of the reference vehicle and the target vehicle are based on the environmental parameters and parameters pertaining to a positional location, a directional location, and vehicle dynamics of the reference vehicle and the target vehicle;
estimate a probability of collision between the reference vehicle and the target vehicle at the intersection based on the path of travel of the reference vehicle and the target vehicle, wherein the probability of collision includes at least one value that is indicative of an intensity of collision and a propensity of collision between the reference vehicle and the target vehicle; and
provide a collision avoidance response, wherein a type of the collision avoidance response is based on the probability of collision between the reference vehicle and the target vehicle at the intersection.

11. The system of claim 10, wherein determining the environmental parameters includes receiving data collected from roadside equipment located within the vicinity of the intersection and evaluating intersection metrics processed from the data to determine that a requisite amount of the data is collected from the roadside equipment to determine the environmental parameters, wherein the intersection metrics include at least one of: a traffic density within the vicinity of the intersection, weather conditions within the vicinity of the intersection, and a number of roadways that intersect at the intersection.

12. The system of claim 10, wherein determining environmental parameters includes ceasing the determination of environmental parameters associated with the vicinity of the intersection for a period of time to account for an abnormal route activity that occurs within the vicinity of the intersection, wherein the abnormal route activity includes at least one of: a traffic accident that occurs within the vicinity of the intersection, road construction that occurs within the vicinity of the intersection, and a power outage that occurs within the vicinity of the intersection.

13. The system of claim 12, wherein determining the environmental parameters includes restarting the determination of environmental parameters associated with the vicinity of the intersection upon completion of the abnormal route activity that occurred within the vicinity of the intersection.

14. The system of claim 10, wherein estimating the path of travel of the reference vehicle and the target vehicle includes evaluating positional parameters pertaining to the positional location of the reference vehicle and the target vehicle, directional parameters pertaining to the directional location of the reference vehicle and the target vehicle, and dynamic parameters pertaining to the vehicle dynamics of the reference vehicle and the target vehicle.

15. The system of claim 14, wherein estimating the path of travel of the reference vehicle and the target vehicle includes aggregating the environmental parameters associated with the vicinity of the intersection with the positional parameters, the directional parameters, and the dynamic parameters of the reference vehicle and of the target vehicle.

16. The system of claim 10, wherein estimating the probability of collision between the reference vehicle and the target vehicle at the intersection includes determining if the path of travel of the reference vehicle overlaps with the path of travel of the target vehicle.

17. The system of claim 10, wherein estimating the probability of collision between the reference vehicle and the target vehicle at the intersection includes adjusting the at least one value that is indicative of the intensity of the collision and the propensity of the collision between the reference vehicle and the target vehicle based on a potential collision warning provided within at least one of: the reference vehicle and the target vehicle.

18. The system of claim 10, wherein estimating the probability of collision between the reference vehicle and the target vehicle at the intersection includes adjusting the at least one value that is indicative of the intensity of the collision and the propensity of the collision between the reference vehicle and the target vehicle based on an intended destination of the target vehicle, wherein the intended destination includes a destination received by a navigation system of the target vehicle.

19. A non-transitory computer-readable storage medium storing instructions that when executed by a processor perform actions, comprising:

determining environmental parameters associated with a vicinity of an intersection;

estimating a path of travel of a reference vehicle and a target vehicle, wherein the path of travel of the reference vehicle and the target vehicle are based on the environmental parameters and parameters pertaining to a positional location, a directional location, and vehicle dynamics of the reference vehicle and the target vehicle;

estimating a probability of collision between the reference vehicle and the target vehicle at the intersection based on the path of travel of the reference vehicle and the target vehicle, wherein the probability of collision includes at least one value that is indicative of an intensity of collision and a propensity of collision between the reference vehicle and the target vehicle; and providing a collision avoidance response, wherein a type of the collision avoidance response is based on the probability of collision between the reference vehicle and the target vehicle at the intersection.

20. The computer readable storage medium of claim 19, wherein providing the collision avoidance response includes controlling at least one vehicle function of at least one of: the reference vehicle, and the target vehicle to provide one or more types of automatic vehicle collision controls that are provided at one or more levels that correspond to the probability of collision between the reference vehicle and the target vehicle.

* * * * *